(12) United States Patent
Shibata

(10) Patent No.: US 6,887,548 B2
(45) Date of Patent: May 3, 2005

(54) OPTICAL INFORMATION RECORDING MEDIUM

(75) Inventor: Michihiro Shibata, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 12 days.

(21) Appl. No.: 10/087,875

(22) Filed: Mar. 1, 2002

(65) Prior Publication Data

US 2002/0127367 A1 Sep. 12, 2002

(30) Foreign Application Priority Data

Mar. 6, 2001 (JP) ........................................ 2001-061868

(51) Int. Cl.[7] .............................................. B32B 3/02
(52) U.S. Cl. .................... 428/65.2; 428/64.8; 428/64.9; 428/64.4; 428/64.6
(58) Field of Search ......................... 428/65.2, 64.8, 428/64.9, 64.4, 64.6

(56) References Cited

U.S. PATENT DOCUMENTS

| | | | | |
|---|---|---|---|---|
| 5,236,755 A | * | 8/1993 | Howe et al. ................ | 428/64.4 |
| 5,998,094 A | * | 12/1999 | Ishida et al. ........... | 430/270.19 |
| 6,083,597 A | * | 7/2000 | Kondo ........................ | 428/64.1 |
| 6,103,331 A | * | 8/2000 | Kanno ........................ | 428/64.1 |
| 6,246,656 B1 | * | 6/2001 | Kawakubo et al. ..... | 369/112.23 |
| 6,309,728 B1 | * | 10/2001 | Usami et al. ............... | 428/64.1 |
| 6,376,040 B1 | * | 4/2002 | Usami ........................ | 428/64.4 |
| 6,440,519 B1 | * | 8/2002 | Takase et al. .............. | 428/65.2 |
| 2002/0034155 A1 | * | 3/2002 | Usami ........................ | 369/286 |

FOREIGN PATENT DOCUMENTS

| | | |
|---|---|---|
| DE | 3932460 A1 | 4/1990 |
| EP | 0768353 A1 | 4/1997 |
| EP | 1187120 A2 | 3/2002 |
| JP | 2000-063450 A1 | 2/2000 |
| WO | WO-00/40663 A1 | 7/2000 |

* cited by examiner

Primary Examiner—Deborah Jones
Assistant Examiner—G. Blackwell-Rudasill
(74) Attorney, Agent, or Firm—Stroock & Stroock & Lavan LLP

(57) ABSTRACT

An optical information recording medium includes a substrate having a thickness of approximately 1.0 mm to 1.2 mm, with a spiral pre-groove being formed at a predetermined area on the substrate excluding a central hole and an outer periphery. Successively disposed on the area at which the pre-groove is formed are a light-reflective layer, a recording layer that can record information when irradiated with light having a wavelength range of 380 nm to 500 nm, a protective layer for protecting the recording layer, an adhesive layer made of a photocurable resin that has been cured by being irradiated with visible light, and a thin transparent protective layer.

20 Claims, 2 Drawing Sheets

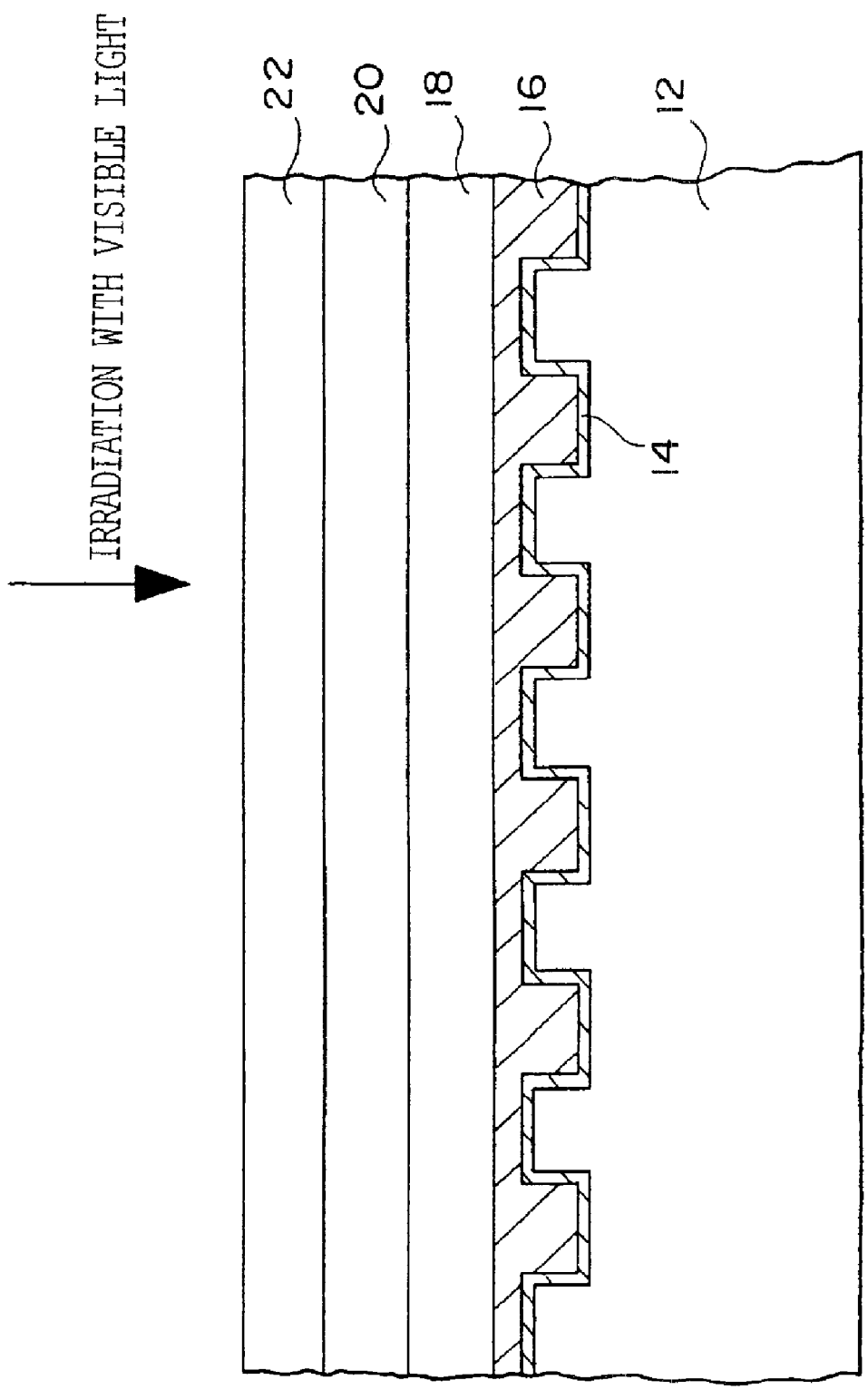

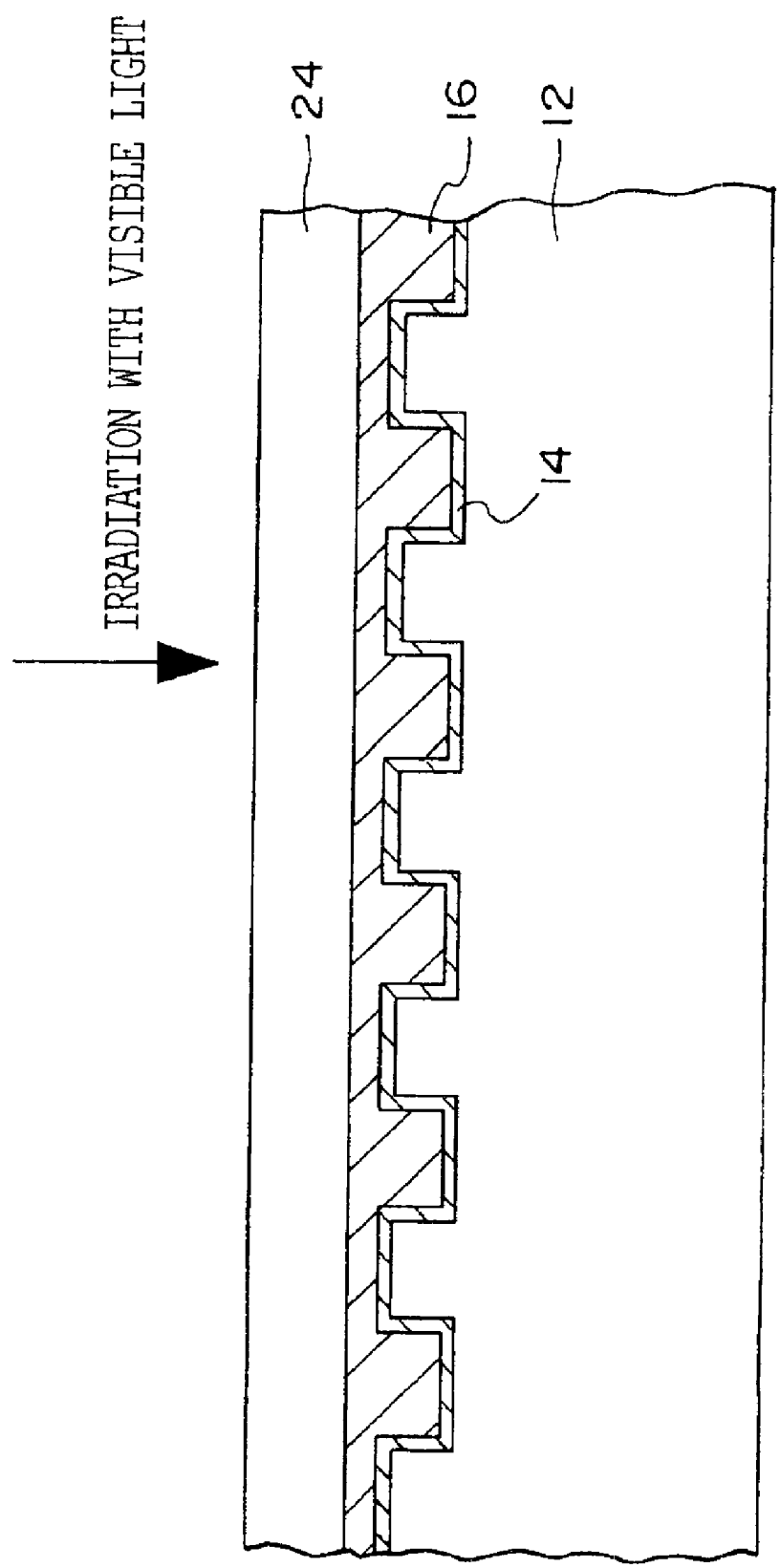

OPTICAL INFORMATION RECORDING MEDIUM

BACKGROUND OF THE INVENTION

1. Field of the Invention

The present invention relates to an optical information recording medium, and in particular to an optical information recording medium on which information is recorded and with which information is reproduced by irradiating the medium with laser light from the side of the medium at which a thin protective layer is disposed.

2. Description of the Related Art

A CD-R is a writable, optical information recording medium (optical disc) on which information can be written only once by irradiation with laser light, and is widely known. A CD-R typically comprises a transparent disc substrate having successively disposed thereon a dye recording layer including an organic dye, a light-reflective layer including metal such as gold, and a protective layer made of resin. Information is recorded on the optical disc by irradiating the optical disc with near infrared laser light (i.e., laser light generally having a wavelength of around 780 nm). Specifically, the portion of the dye recording layer that is irradiated absorbs light, whereby temperature increases at the irradiated portion. The increase in temperature produces a physical or chemical change (e.g., formation of pits) to alter the optical properties of the irradiated portion, whereby information is recorded. The information thus recorded on the optical disc is ordinarily reproduced by irradiating the optical disc with laser light having the same wavelength as that of the light used to record the information and detecting a difference in reflectance between the region of the dye recording layer whose optical properties have been changed (recorded portion) and the region of the dye recording layer whose optical properties have not been changed (unrecorded portion).

DVD-Rs, which are writable optical discs that can be recorded at a higher density than CD-Rs, have also come into widespread use and continue to gain prominence as media on which massive amounts of information can be recorded. In order to increase the recording density of optical information recording media such as CD-Rs and DVD-Rs, it is effective to reduce the spot diameter of laser beam. The spot diameter is proportional to $\lambda/NA$ (where NA is the numerical aperture of the lens and $\lambda$ is the wavelength of the write laser). In order to reduce the spot diameter, it is effective to shorten the wavelength of the write laser or to enlarge the numerical aperture of the lens. When the numerical aperture NA of the lens is enlarged, spherical aberration thereof increases in proportion to the 4th power of the numerical aperture. Thus, it is necessary to reduce the thickness from the surface upon which light is made incident to the recording layer. A DVD-R achieves a recording capacity 7 times greater than that of a CD-R by enlarging the numerical aperture of the lens more than a CD-R (from 0.45 for a CD-R to 0.6 for a DVD-R) and by shortening the wavelength of the write laser (from 780 nm for a CD-R to 635 nm for a DVD-R). Moreover, by increasing the numerical aperture of the lens, substrate thickness at the side where light is made incident is reduced to 0.6 mm, which is half the thickness of a CD-R, and spherical aberration is lowered.

With the development of laser technology in recent years, short-wavelength lasers such as blue lasers have come to be used. Together with this development, there has been progress in the development of new optical information recording media capable of being recorded at high density by light having wavelengths shorter than conventional recording wavelengths (780 nm or 630 nm). As mentioned in the preceding paragraph, the smaller the spot diameter of laser beam is, the higher the recording density can become, and it is necessary to form a recording layer at a shallow position from the surface in order to reduce the spot diameter. To this end, Japanese Patent Application Laid-Open (JP-A) No. 2000-11454 proposes an optical information recording medium including a substrate having disposed at the opposite side thereof a thin protective layer of a predetermined thickness, with short-wavelength light being irradiated from the side of the medium disposed with the thin protective layer to record information on the medium. It has been customary to use photocurable resins, such as resins photocurable by ultraviolet light, to form the protective layer.

However, when a thin protective layer is disposed at the side of the medium opposite to the side at which the substrate is disposed, it becomes necessary to successively dispose on the substrate a light-reflective layer, a recording layer and the thin protective layer, whereby the recording layer is also irradiated with light at the same time that the photocurable resin is irradiated with and photocured by light to form the thin protective layer. There is thus the problem that the recording substance in the recording layer is partly deteriorated when the medium is fabricated, whereby recording properties are adversely affected. In particular, when the recording layer includes a dye, the dye absorbs light of wavelengths even shorter than 400 nm, including ultraviolet light, whereby the layer easily decomposes and is seriously deteriorated.

JP-A No. 11-27314 proposes an optical information recording medium comprising a substrate having adhered thereto a transparent film via a pressure-sensitive adhesive sheet or a dry polymer sheet, whereby a light-transmitting, thin protective layer is thus formed without irradiation with ultraviolet light. However, there is the problem that air bubbles are produced between the transparent film and the substrate when the transparent film is adhered to the substrate via the pressure-sensitive adhesive sheet, which results in poor adhesion.

SUMMARY OF THE INVENTION

The present invention was accomplished in consideration of the preceding problems in the prior art. It is an object of the present invention to provide an optical information recording medium that exhibits excellent recording properties by inhibiting deterioration of a recording layer during the process of fabricating the medium.

The above object is attained by the present invention described below.

A first aspect of the present invention is an optical information recording medium comprising: a substrate; a light-reflective layer formed on the substrate; a recording layer formed on the light-reflective layer, which records information when irradiated with laser light; and a thin protective layer formed directly on the recording layer, the thin protective layer transmitting laser light used for information recording and reproduction and being made of a photocurable resin that has been cured by being irradiated with visible light.

A second aspect of the present invention is an optical information recording medium comprising: a substrate; a light-reflective layer formed on the substrate; a recording layer formed on the light-reflective layer, which records information when irradiated with laser light; an adhesive layer formed on the recording layer, the adhesive layer being made of a photocurable resin that has been cured by being irradiated with visible light; and a thin protective layer formed on the adhesive layer, the thin protective layer transmitting laser light used for information recording and reproduction.

The optical information recording media of the first and second aspects respectively comprise a substrate having successively disposed thereon a light-reflective layer and a recording layer that records information when irradiated with laser light, with a thin protective layer being formed on the recording layer either directly or via an adhesive layer. With these media, it is possible to record thereon and reproduce therewith information by irradiating the media with laser light from the side of the media at which the thin protective layer is disposed.

In the optical information recording medium of the first aspect, the thin protective layer includes the resin that is photocured by visible light. In the optical information recording medium of the second aspect, the adhesive layer includes the resin that is photocured by visible light. Thus, according to the present invention, it is possible to provide an optical information recording medium that exhibits excellent recording properties because the thin protective layer is formed without irradiation with ultraviolet light, whereby deterioration of the recording layer during the process of fabricating the medium is inhibited.

The optical information recording medium of the present invention exhibits particularly remarkable effects when information can be recorded on the recording layer by laser light having a wavelength of 380 nm to 550 nm, and when the recording layer includes an organic compound such as a dye for the recording substance.

The visible light as used herein has a wavelength range of from 400 nm to 700 nm. In order to cure the photocurable resin present in the medium, the visible light preferably has a wavelength range of from 420 nm to 600 nm, and more preferably from 450 nm to 550 nm.

BRIEF DESCRIPTION OF THE DRAWINGS

FIG. 1 is a schematic cross-sectional view showing layers of an optical information recording medium according to a first embodiment of the present invention.

FIG. 2 is a schematic cross-sectional view showing layers of an optical information recording medium according to a second embodiment of the present invention.

DESCRIPTION OF THE PREFERRED EMBODIMENTS

An optical information recording medium of the present invention is described in detail below with reference to the drawings attached hereto.

First Embodiment

The optical information recording medium (disc) of the first embodiment of the present invention is writable only once by short-wavelength light. As seen in the schematic cross-sectional view of FIG. 1, the medium includes a substrate 12 having a thickness of approximately 1.0 mm to 1.2 mm and a central hole (not shown) formed in a substantial center of the substrate 12 when seen in planar view. A spiral pre-groove is formed at a predetermined area on the substrate 12 excluding the central hole and an outer periphery. Successively disposed on the area of the substrate 12 at which the pre-groove is formed are a light-reflective layer 14, a recording layer 16 on which information can be recorded by irradiation with laser light having a wavelength range of 380 nm to 500 nm, a protective layer 18 for protecting the recording layer 16, an adhesive layer 20, and a transparent thin protective layer 22. In the present embodiment, the adhesive layer 20 is made of a photocurable resin that has been cured by being irradiated with visible light. The respective layers of the optical information recording medium of the present embodiment are described in detail below.

The substrate 12 may be any material suitably selected from conventionally used substrate materials for producing optical information recording media. Illustrative examples of the substrate materials include glass, polycarbonates, acrylic resins such as polymethyl methacrylates, vinyl chloride resins such as polyvinyl chloride and vinyl chloride copolymer, epoxy resins, amorphous polyolefins, polyesters, and metals such as aluminium. These materials may also be used in combination. Among the materials described above, amorphous polyolefin and polycarbonate are preferable because of good moisture resistance, good dimensional stability and inexpensiveness. Most preferable is polycarbonate. Preferably, the thickness of the substrate 12 ranges from 1.0 mm to 1.2 mm.

On the substrate 12 is formed a guide groove for tracking or a concavo-convex groove indicating information such as an address signal. In order to achieve higher recording density, it is preferable to use a substrate disposed with a pre-groove having a track pitch that is narrower than the track pitch of a CD-R or DVD-R. The track pitch of the pre-groove is preferably from 0.2 $\mu$m to 0.8 $\mu$m, more preferably from 0.25 $\mu$m to 0.6 $\mu$m, even more preferably from 0.27 $\mu$m to 0.4 $\mu$m. The depth of the pre-groove is preferably from 0.03 $\mu$m to 0.18 $\mu$m, more preferably from 0.05 $\mu$m to 0.15 $\mu$m, and even more preferably from 0.06 $\mu$m to 0.1 $\mu$m.

A subbing layer may be disposed between the substrate 12 and the light-reflective layer 14 in order to improve flatness and adhesion of the light-reflective layer 14 to the substrate. Examples of materials for producing a subbing layer include polymers such as polymethyl methacrylate, acrylic acid/methacrylic acid copolymer, styrene/maleic anhydride copolymer, polyvinyl alcohol, N-methylolacrylamide, styrene/vinyltoluene copolymer, chlorosulfonated polyethylene, nitrocellulose, polyvinyl chloride, chlorinated polyolefin, polyester, polyimide, vinyl acetate/vinyl chloride copolymer, ethylene/vinyl acetate copolymer, polyethylene, polypropylene, polycarbonate; and surface modifiers such as a silane coupling agent. The subbing layer may be formed, for example, by dissolving or dispersing the above material in a suitable solvent to prepare a coating solution, and then applying the coating solution onto the surface of the substrate using any of coating methods such as spin coating, dip coating or extrusion coating. The thickness of the subbing layer is generally from 0.005 $\mu$m to 20 $\mu$m, and preferably from 0.01 $\mu$m to 10 $\mu$m.

The light-reflective layer 14 includes a light-reflective substance having high reflectance with respect to laser light. Preferably, the reflectance of the substance is at least 30%, more preferably at least 50%, and even more preferably at least 70%. Examples of the substance include metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn and Bi, as well as stainless steel. These substances may be used either singly or in combination of two or more. Alloys thereof may also be used. Among these, preferable are Cr, Ni, Pt, Cu, Ag, Au, Al and stainless steel, more preferable are Au, Ag, Al and their alloys, and most preferable are Ag, Al and their alloys. The light-reflective layer 14 may be formed on the substrate 12, for example, through vapor deposition, sputtering or ion plating of any of the above-mentioned light-reflective substances. The thickness of the light-reflective layer 14 is generally from 10 nm to 500 nm, and preferably from 50 nm to 200 nm.

The recording layer 16 may be any one of a recording layer that includes an organic dye, a phase-transient recording layer in which information is recorded by a phase transition, and a magneto-optical recording layer in which information is recorded magneto-optically. However, in the present invention, the recording layer 16 is preferably one that includes as a recording substance an organic compound, such as a cyanine dye, an oxonole dye, a metal complex dye, an azo dye or a phthalocyanine dye, in order for information to be recorded on the recording layer 16 by irradiation with short-wavelength laser light having a wavelength of 380 nm to 500 nm. For example, the dyes described in JP-A Nos. 4-74690, 8-127174, 11-53758, 11-334204, 11-334205, 11-334206, 11-334207, 2000-43423, 2000-108513 and 2000-158818 may be suitably used. The recording substance is not specifically limited to such dyes and other examples thereof include other organic compounds such as triazole compounds, triazine compounds, cyanine compounds, merocyanine compounds, aminobutadiene compounds, phthalocyanine compounds, cinnamate compounds, viologen compounds, azo compounds, oxonole-benzoxazole compounds, and benzotriazole compounds. Among these compounds, particularly preferable are cyanine compounds, aminobutadiene compounds, benzotriazole compounds and phthalocyanine compounds.

The recording layer 16 may be produced, for example, by dissolving the recording substance, such as the dye, together with a binder in a suitable solvent to prepare a coating solution, applying the coating solution on the surface of the substrate to form a film thereon, and then allowing the coating solution to dry. The concentration of the recording substance present in the coating solution is usually from 0.01 to 15% by weight, preferably from 0.1 to 10% by weight, more preferably from 0.5 to 5% by weight, and most preferably from 0.5 to 3% by weight.

Examples of the solvent used for the coating solution include esters such as butyl acetate, ethyl lactate and cellosolve acetate; ketones such as methyl ethyl ketone, cyclohexanone and methyl isobutyl ketone; chlorinated hydrocarbons such as dichloromethane, 1,2-dichloroethane and chloroform; amides such as dimethylformamide; hydrocarbons such as methylcyclohexane; ethers such as tetrahydrofuran, ethyl ether and dioxane; alcohols such as ethanol, n-propanol, isopropanol, n-butanol and diacetone alcohol; fluorine-containing solvents such as 2,2,3,3-tetrafluoropropanol; and glycol ethers such as ethylene glycol monomethyl ether, ethylene glycol monoethyl ether and propylene glycol monomethyl ether. These solvents may be used either singly or in combination of two or more, depending on the solubility of the recording substance used. The coating solution may further include as needed various additives such as an antioxidant, an ultraviolet absorber, a plasticizer and a lubricant.

Examples of the binder include natural organic polymers such as gelatin, cellulose derivatives, dextran, rosin and rubber; and synthetic organic polymers, for example, hydrocarbon resins such as polyethylene, polypropylene, polystyrene and polyisobutylene, vinylic resins such as polyvinyl chloride, polyvinylidene chloride and polyvinyl chloride/polyvinyl acetate copolymer, acrylic resins such as poly(methyl acrylate) and poly(methyl methacrylate), polyvinyl alcohol, chlorinated polyethylene, epoxy resins, butyral resins, rubber derivatives, and precondensates of a thermosetting resin such as phenol-formaldehyde resin. When the binder is used together with the recording substance, the amount of the binder in the recording layer is generally from 0.01 time to 50 times (mass ratio), and preferably from 0.1 time to 5 times (mass ratio) of the amount of the recording substance used. The concentration of the recording substance present in the coating solution is generally from 0.01 to 10% by weight, and preferably from 0.1 to 5% by weight.

The recording layer 16 is coated by, for example, spraying, spin coating, dipping, roll coating, blade coating, doctor roll coating, and screen printing. The recording layer 16 may be mono-layered or multi-layered. The thickness of the recording layer 16 is generally from 10 nm to 500 nm, preferably from 30 nm to 300 nm, and more preferably from 50 nm to 100 nm.

The recording layer 16 may optionally include a variety of anti-fading agents to improve light resistance of the recorded layer. Singlet oxygen quenchers are usually employed as the anti-fading agent and those described in patent and other publications may be used, including those described in JP-A Nos. 58-175693, 59-81194, 60-18387, 60-19586, 60-19587, 60-35054, 60-36190, 60-36191, 60-44554, 60-44555, 60-44389, 60-44390, 60-54892, 60-47069, 63-209995 and 4-25492; JP-B Nos. 1-38680 and 6-26028; German Patent No. 350,399; and *the Journal of the Chemical Society of Japan*, October 1992, page 1141. The amount of the anti-fading agent such as a singlet oxygen quencher to be used is generally from 0.1 to 50% by weight, preferably from 0.5 to 45% by weight, more preferably from 3 to 40% by weight, and particularly preferably from 5 to 25% by weight of the colorant used.

The protective layer 18 is disposed to protect the recording layer 16 and to enhance adhesion between the recording layer 16 and the thin protective layer 22. The materials for producing the protective layer 18 include, for example, SiO, $SiO_2$, $MgF_2$, $SnO_2$, $Si_3N_4$, and ZnS. A mixture of ZnS and $SiO_2$ may also serve to produce the protective layer 18. In this case, $SiO_2$ is preferably used in a mixing ratio of 3 to 45 mol %. The thickness of the protective layer 18 is preferably from 1.0 nm to 500 nm, and more preferably from 10 nm to 100 nm. The protective layer 18 may be formed by vacuum evaporation such as vapor deposition or sputtering.

The thin protective layer 22 is disposed, via the adhesive layer 20 made of a photocurable resin having been cured by visible light, on the protective layer 18 and opposite from the substrate 12 with respect to the recording layer 16. The thin protective layer 22 is formed to enhance scratch and moisture resistance of the optical information recording medium. Preferably, the thin protective layer is made of a transparent resin film, for example, a polycarbonate film (PC film) or a triacetyl cellulose film (TAC film). The term "transparent" as used herein means transparent to light both for data recording and reproduction. It is also preferable that the thin protective layer 22 further includes a UV absorber to enhance light-fastness of the optical information recording medium. It is preferable that the UV absorber used for this purpose slightly absorbs the light at wavelengths for information recording and reproduction.

The thin protective layer 22 is formed by dissolving a photocurable resin (which forms the adhesive layer 20) in a suitable solvent to prepare a coating solution, applying the coating solution onto a protective layer 18 at a predetermined temperature, laminating a resin film over the thus-coated layer, followed by irradiation with visible light from the side of the laminated resin film through a UV-cut filter for curing the coated layer so that the resin films may be adhered to the protective layer 18. The thickness of the thin protective layer 22 is generally from 10 μm to 300 μm, and preferably from 100 μm to 200 μm.

In order to control viscosity, the coating temperature preferably ranges from 23° C. to 50° C., more preferably from 24° C. to 40° C., and even more preferably from 25° C. to 37° C. In order to prevent the disc from warping, it is preferable to use a pulse-type light emitter to irradiate the coated layer with light. The pulse interval is preferably in the order of below msec, and more preferably below μsec. The amount of light irradiated per pulse is not specifically limited, but is preferably no more than 3 kW/cm$^2$, and more preferably no more than 2 kW/cm$^2$. The number f times irradiation is conducted is not specifically limited, but is preferably no more than 20 times, and more preferably no more than 10 times. The light with which the coating layer is irradiated can be restricted to have a predetermined wavelength range by means of an optical filter. The coated layer may be irradiated with light having a narrow wavelength range, using a light source such as a laser beam.

There are no particular limitations on the photocurable resin forming the adhesive layer 20 as long as the resin includes a photosensitive group that can be crosslinked or polymerized when irradiated with visible light. Examples thereof include photocurable resins into which a photopolymerizable unsaturated group has been introduced to modified resins such as acrylate resins, urethane resins, epoxy resins, polyester resins, polyether resins, alkyd resins, polyvinyl chloride resins, fluorine-containing resins, silicone resins, vinyl acetate resins and novolak resins. The modified resins to which the photopolymerizable unsaturated group has been introduced may be used in combination of two or more. Examples of the photopolymerizable unsaturated group include an acryloyl group, a methacryloyl group, a vinyl group, a styryl group, an allyl group, a cinnamoyl group, a cinnamylidene group and an azido group.

Among the photocurable resins mentioned above, preferable are those which include monomers, prepolymers, dimers, trimers and other oligomers having at least one ethylenically unsaturated double bond in the molecule, as well as their mixtures and copolymers. More preferable are the photocurable resins which include monofunctional or polyfunctional(meth)acrylate.

In order to prevent the disc from warping, it is preferable for the photocurable resin to have a low coefficient of contraction. In order to reduce absorption of light by the adhesive layer 20 and to raise light reflectance, it is preferable for the photocurable resin to have a high degree of transmittance with respect to light used both in recording and in reproduction. Furthermore, in order to minimize damage to the recording layer caused by moisture and to improve storability, it is preferable for the photocurable resin to have a low moisture permeability.

An example of such a photocurable resin is Laxtrack LCR (manufactured by Toa Gosei Co., Ltd.), which can be appropriately used in the present invention.

The adhesive layer 20 preferably has a thickness of 0.1 μm to 100 μm, more preferably 1 μm to 50 μm, and even more preferably from 2 μm to 20 μm to obtain sufficient protection and to prevent the disc from warping.

Information is recorded on the optical information recording medium (disc) in the following manner. While the disc is rotated at a constant linear speed (for a CD format, from 1.2 to 1.4 m/sec) or at a constant angular speed, the disc is irradiated with laser light from the side of the disc at which the thin protective layer 22 is disposed. The irradiated portion of the recording layer 16 absorbs the irradiated light, whereby temperature increases at the irradiated portion. The increase in temperature produces a physical or chemical change (e.g., formation of pits) to thereby alter the optical properties of the irradiated portion, whereby information is recorded on the recording layer 16.

Examples of lasers that have an oscillating wavelength in a range of 380 nm to 550 nm and can be used in the present invention include, for example, a blue-violet semiconductor laser having an oscillating wavelength range from 390 nm to 415 nm, a blue-green semiconductor laser having a central oscillating wavelength of 515 nm, and a blue-violet SHG laser having a central oscillating wavelength of 425 nm and comprising an IR semiconductor laser having a central oscillating wavelength of 850 nm and an optical waveguide-type wavelength conversion element (SHG). In order to achieve higher recording density, particularly preferable for use is the blue-violet semiconductor laser or SHG laser capable of emitting light of shorter wavelengths. Further, from the standpoint of higher recording density, the object lens used for pick-up preferably has an NA of at least 0.7, and more preferably at least 0.85.

The information recorded on the disc is reproduced by rotating the disc at the same constant linear speed as that used in recording, irradiating the disc with laser light from the side of the disc at which the thin protective layer 22 is disposed, and detecting the reflected light.

According to the present embodiment, the thin protective layer 22 is disposed on the recording layer 16 via the protective layer 18 and the adhesive layer 20. The adhesive layer 20 includes the resin that is photocured when irradiated with visible light. Therefore, the adhesive layer 20 can be photocured without the use of ultraviolet light, and it becomes possible to suppress deterioration of the recording substance (e.g., the dye) in the process of fabricating the optical information recording medium. Hence, it is possible to obtain an optical information recording medium that is writable by short-wavelength light and has excellent recording properties. Moreover, even when a UV absorber is included in the thin protective layer 22 to enhance the light-fastness of the medium, the adhesive layer 20 can be sufficiently cured by visible light so that the medium obtains sufficient mechanical strength and storability.

Further according to the present embodiment, the protective layer 18 is disposed between the recording layer 16 and the adhesive layer 20, whereby deterioration of the recording layer 16 caused by the adhesive with the passing of time can be prevented. In addition, according to the present embodiment, there is an advantage in that the thin protective layer 22 achieves a uniform thickness since this layer is produced by laminating a preformed resin film having a predetermined thickness.

Additionally, because the photocurable resin forming the adhesive layer 20 is dissolved in a solvent to produce a coating solution to be applied on the protective layer 18 so that a resin film can be laminated on the coated layer, it becomes difficult for air bubbles to form between the transparent film and the substrate, as compared with a case where a transparent film is stuck onto the substrate via a pressure-sensitive adhesive sheet or a dry polymer sheet.

Second Embodiment

The optical information recording medium (disc) of the second embodiment of the present invention is also writable only once by short-wavelength light. As seen in the schematic cross-sectional view of FIG. 2, the medium includes a substrate 12 having a thickness of approximately 1.0 mm to 1.2 mm and a central hole (not shown) formed in a substantial center of the substrate 12 when seen in planar view. A spiral pre-groove is formed at a predetermined area on the substrate 12 excluding the central hole and an outer periphery. Successively disposed on the area of the substrate 12 at which the pre-groove is formed are a light-reflective layer 14, a recording layer 16, and a transparent thin protective layer 24 for protecting the recording layer 16. The present embodiment is characterized in that the thin protective layer 24 includes the photocurable resin that is cured by being irradiated with visible light. The respective layers of the optical information recording medium of the present embodiment are described in detail below. Elements that are the same as those described in the first embodiment are designated by the same reference numerals, and description thereof is omitted.

According to the second embodiment, the thin protective layer 24 includes the transparent photocurable resin that has been cured by being irradiated with visible light. The term "transparent" as used herein means transparent to light both for information recording and reproduction. The thin protective layer 24 is formed by dissolving a photocurable resin in a suitable solvent to prepare a coating solution, applying the coating solution onto the recording layer 16 at a predetermined temperature, and irradiating the coating solution with visible light passing through a UV-cut filter to thus cure the thus-coated layer. It is preferable that the thin protective layer 24 includes a UV absorber to enhance the light-fastness of the optical information recording medium. The thickness of the layer 24 is generally from 10 $\mu$m to 300 $\mu$m, and preferably from 100 $\mu$m to 200 $\mu$m.

There are no particular limitations on the photocurable resin included in the thin protective layer 24 as long as the resin includes a photosensitive group that can be crosslinked or polymerized when irradiated with visible light. Examples thereof include the photocurable resins previously listed in connection with the adhesive layer 20 of the first embodiment.

Information is recorded on and reproduced with the optical information recording medium in the same manner as previously described in the first embodiment.

According to the present embodiment, the thin protective layer 24 is disposed directly on the recording layer 16 and includes the resin that is photocured when irradiated with visible light. Therefore, the thin protective layer 24 can be photocured without the use of ultraviolet light, and it becomes possible to suppress deterioration of the recording substance (e.g., the dye) in the process of fabricating the optical information recording medium. Hence, it is possible to obtain an optical information recording medium that is writable by short-wavelength light and has excellent recording properties. Moreover, even when a UV absorber is included in the thin protective layer 24 to enhance the light-fastness of the medium, the thin protective layer 24 can be sufficiently cured by visible light so that the medium obtains sufficient mechanical strength and storability.

Moreover, the thin protective layer 24 is formed directly on the recording layer, which eliminates air bubbles and simplifies the layer construction, to thus reduce production costs.

In the first and second embodiments, examples of optical information recording media including a recording layer writable by irradiating the recording layer with laser light having a wavelength range from 380 nm to 500 nm have been described. However, the embodiments of the present invention can also be applied to optical information recording media including a recording layer writable by light having different wavelengths.

In order to prevent the surface of the disc on which light is made incident during recording and playback from being scratched, a hardcoat layer comprising a photocurable resin is occasionally formed on the same surface in conventional CD-Rs and DVD-Rs. In this case, the recording layer is also irradiated with light when the photocurable resin is irradiated with light and cured to form the hardcoat layer. There has thus been the problem that recording properties are adversely affected when the CD-R or DVD-R is fabricated due to partial deterioration in the recording substance included in the recording layer. However, as in the present invention, by including in the hardcoat layer the photocurable resin cured by visible light, it becomes possible to obtain an optical information recording medium that has excellent recording properties and in which deterioration of the recording layer during fabrication are inhibited.

There are also cases where, regardless of whether the recording layer is directly irradiated with ultraviolet light or not, the recording layer chemically suffers deterioration via the light-reflective layer or from ultraviolet light being made incident on the reverse side of the disc. Accordingly, by using, as in the present invention, the photocurable resin cured by visible light when forming the protective layer and plying discs in conventional CD-Rs and DVD-Rs, it becomes possible to obtain an optical information recording medium that has excellent recording properties and in which deterioration of the recording layer during fabrication are inhibited.

EXAMPLES

The present invention is described in more detail with reference to the following examples, but it is to be understood that the present invention is not limited to the examples.

Example 1

Injection molding was used to produce a polycarbonate substrate (outer diameter: 120 mm; inner diameter: 15 mm; thickness: 1.1 mm), having on a surface thereof a spiral pre-groove (track pitch: 0.3 nm; pre-groove width: 100 nm; pre-groove depth: 100 nm). The surface of the polycarbonate substrate disposed with the pre-groove was sputtered with Ag to form a light-reflective layer (thickness: 150 nm).

Subsequently, 1.0 g of a compound (A) represented by the formula below was dissolved in 100 ml of 2,2,3,3-tetrafluoropropanol over a period of 2 hours, using an ultrasonic oscillator to prepare a coating solution for a recording layer. This solution was applied onto the surface of the light-reflective layer by spin-coating while varying the number of revolutions from 300 rpm to 4000 rpm. The coated layer was dried to form a recording layer having a thickness of 100 nm. Then, $SiO_2$ was sputtered onto the recording layer to form thereon a protective layer having a thickness of 90 nm.

A photocurable resin (Laxtrack LCR, manufactured by Toa Gosei Co., Ltd.) serving as an adhesive was applied onto the resulting protective layer by spin-coating while varying the number of revolutions from 100 rpm to 300 rpm. Then, a PC film having a thickness of 100 nm was laminated on the adhesive layer, and while increasing the number of revolutions from 300 rpm to 4000 rpm to spread the adhesive on the entire surface, the resultant layer was irradiated with visible light having passed through a UV cut filter to make an adhesive layer and a thin protective layer cured. As a result of the above processes, an optical disc according to the present invention comprising a substrate having formed thereon a light-reflective layer, a recording layer, a protective layer, an adhesive layer and a thin protective layer was produced.

Comparative Example 1

A comparative optical disc was fabricated in the same manner as in Example 1, except that for an adhesive, a UV-curable resin (SD318, manufactured by Dai-Nippon Ink and Chemical Co., Ltd.) was used in place of the photocurable resin used in Example 1, and the UV-curable resin was cured by irradiating the resin with UV light.

Evaluation of Optical Discs

Using a blue-violet semiconductor laser (oscillation wavelength: 405 nm), a signal 14T-EFM was recorded on the optical discs fabricated as above, at a linear speed of 3.5 m/sec, and then the recorded signal was reproduced from the discs. The reproduced signal was analyzed for a maximum recording power Pmax and a minimum recording power Pmin both including margins, relative to a standard recording power $P_0$, so as to determine a C/N (carrier/noise) ratio of the discs. In order to evaluate the discs for information recording and reproduction, DDU1000 manufactured by Pulstec Industrial Co., Ltd. was used.

The results confirmed that the optical discs obtained in Comparative Example 1 in which a UV-curable resin as an adhesive had been cured by irradiation with UV light to form a thin protective layer produced poor results in an initial recording performance such as a ratio of C/N, whereas the optical discs obtained in Example 1 in which a photocurable resin as an adhesive has been cured by irradiation with visible light to form a thin protective layer produced a remarkable increase in an initial recording performance. This is presumably attributed to the facts that in the optical discs obtained in Comparative Example 1, the compound (A) present in the recording layer was decomposed by irradiation with UV light during the process of fabricating the disc leading to a lowered concentration thereof, whereas in the optical discs obtained in Example 1, the compound (A) was prevented from being decomposed with no UV light irradiated during the process of fabrication.

The optical discs fabricated as above were subjected to a compulsory test under severe conditions of irradiation with light from an Xe lamp (170,000 luxes) for 120 hours. After being irradiated, the discs were evaluated for the ratio of C/N in the same manner as above. The optical discs obtained in Example 1 exhibited a better initial recording performance than the optical discs obtained in Comparative Example 1 even after the compulsory test, whereby there was understood to be an increase in storability.

According to the present invention, there is provided an optical information recording medium that exhibits excellent recording properties by inhibiting deterioration of the recording layer during the process of fabricating the medium.

What is claimed is:

1. An optical information recording medium, comprising, in sequence from the base layer upwards:

a substrate base;

a light-reflective layer formed over the substrate;

a recording layer, which records information when irradiated with laser light, formed over the light-reflective layer; and a thin protective layer formed directly on the recording layer, the thin protective layer transmitting laser light used for information recording and reproduction and being made of a photocurable resin that has been cured by being irradiated with visible light, wherein the visible light does not include ultraviolet light.

2. The optical information recording medium according to claim 1, wherein the material for the substrate is selected from the group consisting of glass, polycarbonates, acrylic resins, vinyl chloride resins, epoxy resins, amorphous polyolefins, polyesters and aluminum.

3. The optical information recording medium according to claim 1, wherein the light-reflective layer includes a light-reflective substance selected from the group consisting of Cr, Ni, Pt, Cu, Ag, Au, Al and stainless steel.

4. The optical information recording medium according to claim 3, wherein thickness of the light-reflective layer is from 10 nm to 500 nm.

5. The optical information recording medium according to claim 1, wherein the recording layer includes a colorant selected from the group consisting of cyanine dyes, oxonole dyes, metal complex dyes, azo dyes and phthalocyanine dyes.

6. The optical information recording medium according to claim 1, wherein the recording layer includes a recording substance selected from the group consisting of cyanine compounds, aminobutadiene compounds, benzotriazole compounds and phthalocyanine compounds.

7. The optical information recording medium according to claim 1, wherein thickness of the thin protective layer is from 10 to 300 µm.

8. An optical information recording medium, comprising, in sequence from the base layer upwards:

a substrate base;

a light-reflective layer formed over the substrate;

a recording layer formed over the light-reflective layer, which records information when irradiated with laser light;

an adhesive layer formed over the recording layer, the adhesive layer being made of a photocurable resin that has been cured by being irradiated with visible light, wherein the visible light does not include ultraviolet light; and a thin protective layer formed over the adhesive layer, the thin protective layer transmitting laser light used for information recording and reproduction.

9. The optical information recording medium according to claim 8, wherein the adhesive layer includes a photocurable resin into which a photopolymerizable unsaturated group has been introduced to a modified resin selected from the group consisting of acrylate resins, urethane resins, epoxy resins, polyester resins, polyether resins, alkyd resins, polyvinyl chloride resins, fluorine-containing resins, silicone resins, vinyl acetate resins and novolak resins.

10. The optical information recording medium according to claim 9, wherein the photopolymerizable unsaturated group is a group selected from the group consisting of an acryloyl group, a methacryloyl group, a vinyl group, a styryl group, an allyl group, a cinnamoyl group, a cinnamylidene group and an azido group.

11. The optical information recording medium according to claim 8, wherein the photocurable resin includes a resin selected from the group consisting of monomers, prepolymers and oligomers having at least one ethylenically unsaturated double bond in the molecule, and their mixtures and copolymers.

12. The optical information recording medium according to claim 8, wherein the photocurable resin includes a monofunctional or polyfunctional (meth)acrylate having at least one ethylenically unsaturated double bond in the molecule.

13. The optical information recording medium according to claim 8, wherein thickness of the adhesive layer is from 0.1 μm to 100 μm.

14. The optical information recording medium according to claim 8, further comprising a protective layer disposed between the recording layer and the adhesive layer and made of any of SiO, $SiO_2$, $MgF_2$, $SnO_2$, $Si_3N_4$ and ZnS.

15. The optical information recording medium according to claim 8, wherein the material for the substrate is selected from the group consisting of glass, polycarbonates, acrylic resins, vinyl chloride resins, epoxy resins, amorphous polyolefins, polyesters and aluminum.

16. The optical information recording medium according to claim 8, wherein the light-reflective layer includes a light-reflective substance selected from the group consisting of Cr, Ni, Pt, Cu, Ag, Au, Al and stainless steel.

17. The optical information recording medium according to claim 16, wherein thickness of the light-reflective layer is from 10 nm to 500 nm.

18. The optical information recording medium according to claim 8, wherein the recording layer includes a colorant selected from the group consisting of cyanine dyes, oxonole dyes, metal complex dyes, azo dyes and phthalocyanine dyes.

19. The optical information recording medium according to claim 8, wherein the recording layer includes a recording substance selected from the group consisting of cyanine compounds, aminobutadiene compounds, benzotriazole compounds and phthalocyanine compounds.

20. The optical information recording medium according to claim 8, wherein thickness of the thin protective layer is from 10 μm to 300 μm.

* * * * *